Dec. 6, 1955 H. M. CRAIN 2,726,049

DRIVE MECHANISM FOR MAGNETIC TAPE RECORDERS

Filed Oct. 19, 1953 2 Sheets-Sheet 1

INVENTOR.
HARRY M. CRAIN
BY
Brown, Critchlow, Flick & Peckham
HIS ATTORNEYS

Dec. 6, 1955 H. M. CRAIN 2,726,049

DRIVE MECHANISM FOR MAGNETIC TAPE RECORDERS

Filed Oct. 19, 1953 2 Sheets-Sheet 2

INVENTOR.
HARRY M. CRAIN
BY
Brown, Critchlow, Flick & Peckham
HIS ATTORNEYS 2,726,049
Patented Dec. 6, 1955

2,726,049

DRIVE MECHANISM FOR MAGNETIC TAPE RECORDERS

Harry M. Crain, Philipsburg, Pa., assignor, by mesne assignments, to The Pennsylvania Research Corporation, State College, Pa., a corporation of Pennsylvania Application October 19, 1953, Serial No. 387,006

5 Claims. (Cl. 242—55)

Figure 1:
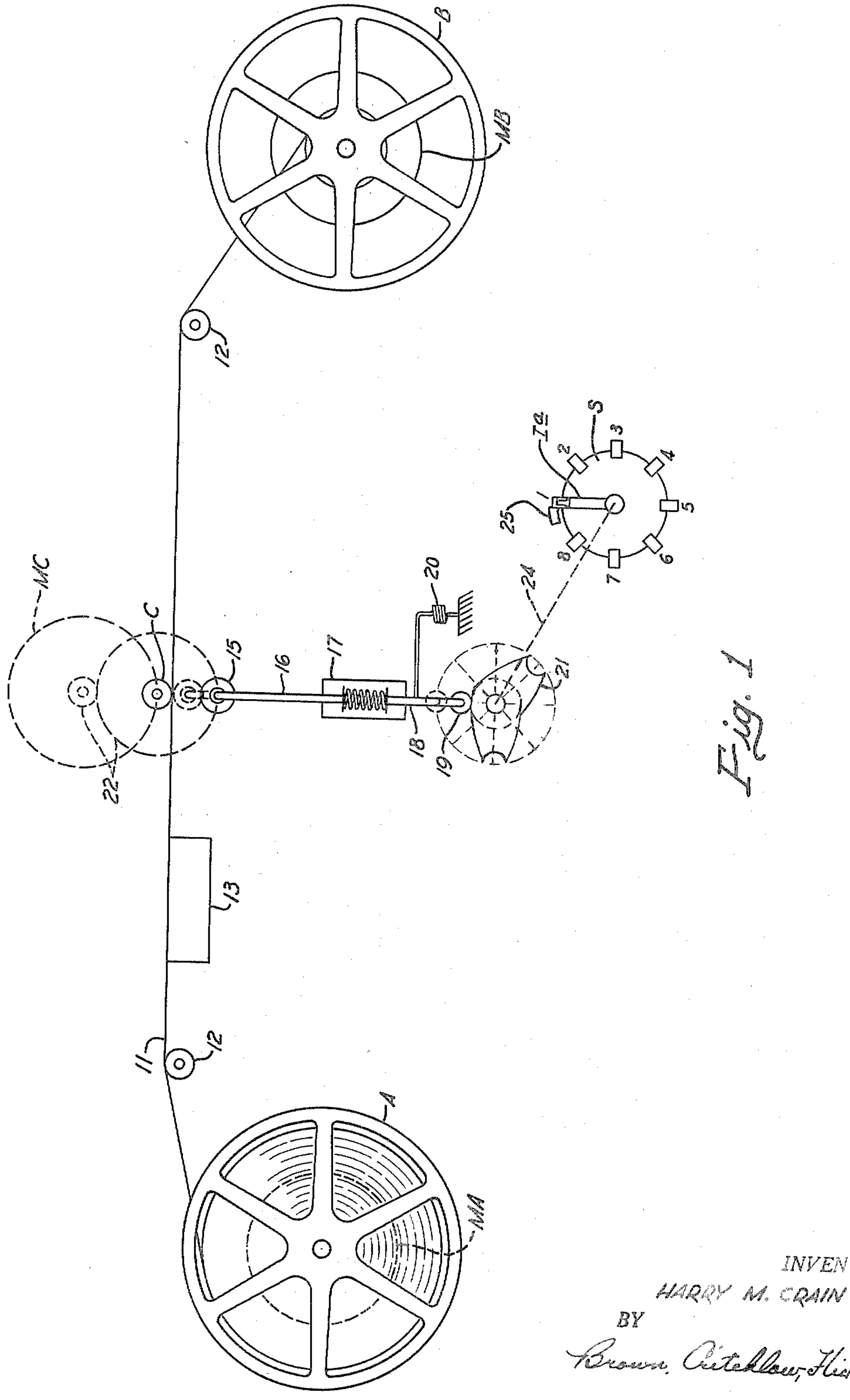

This invention relates to a drive mechanism for magnetic tape recording and reproducing apparatus, in which a long tape of magnetic material, or the like, is wound back and forth between two tape holding reels past an electromagnetic transducer.

The conventional drive mechanism for a tape recorder includes a motor driven capstan adapted to engage the tape and move it at constant speed during the recording and playback operations. It also includes motor driven reels for winding the tape in either direction. Those reels necessarily rotate at different and varying speeds, even when the tape is moved at constant speed by the capstan, due to the changing diameter of the tape coiled on each reel. It has accordingly been the practice to drive whichever reel is acting as the take-up reel through a friction clutch, and to apply a friction brake to the supply reel to maintain adequate tension on the tape. While the disadvantages attending the use of such friction clutches and brakes are overcome by the dynamic braking arrangement described in my copending application, Serial No. 325,823, filed December 13, 1952, the apparatus there described requires a capstan motor of fairly large capacity to obtain the dynamic braking needed to bring the system to a stop. The present invention is an improvement over that described in the above application and permits the use of a smaller capstan motor, having a size dictated only by the power requirements for translating the tape.

In accordance with the present invention, the two tape holding reels are connected to separate electric motors which are adapted, when energized, to apply a winding torque to their respective reels. A third motor drives the capstan, which can be brought into and out of driving engagement with the tape and, when engaged therewith, controls its speed of translation. The electric circuit including the capstan motor and the two reel motors is controlled by a multi-position switch, which has tape running and tape stopping positions. In the tape running positions of the switch, a source of current is connected to the capstan motor and to the reel motor that drives the take-up reel for winding the tape on the latter. The supply reel motor is rotated by the unwinding of the tape from the supply reel and this rotation creates electrical self losses in the supply reel motor that provide dynamic braking for maintaining adequate tension on the tape. In changing from a tape running to a tape stopping position of the switch, the take-up reel motor is no longer energized, but it continues to rotate from its own inertia and that of its connected reel; and this kinetic energy is used to generate a current for energizing a sensing relay. While energized, the sensing relay maintains the connection between the capstan motor and the source of current (the capstan itself being disengaged from the tape) and also connects the source of current to the supply reel motor so that it will apply a winding torque to its connected reel, thereby slowing down the rotation of the take-up reel motor. When the latter has been slowed down to the point that it can no longer energize the sensing relay, that relay assumes its normal released position, in which it disconnects the capstan motor and the supply reel motor from the source of current and at the same time connects the capstan motor as a generator to the supply reel motor, so that the kinetic energy of the former is converted to electrical energy that opposes further unwinding of the supply reel and brings the tape to a smooth stop.

Figure 2:
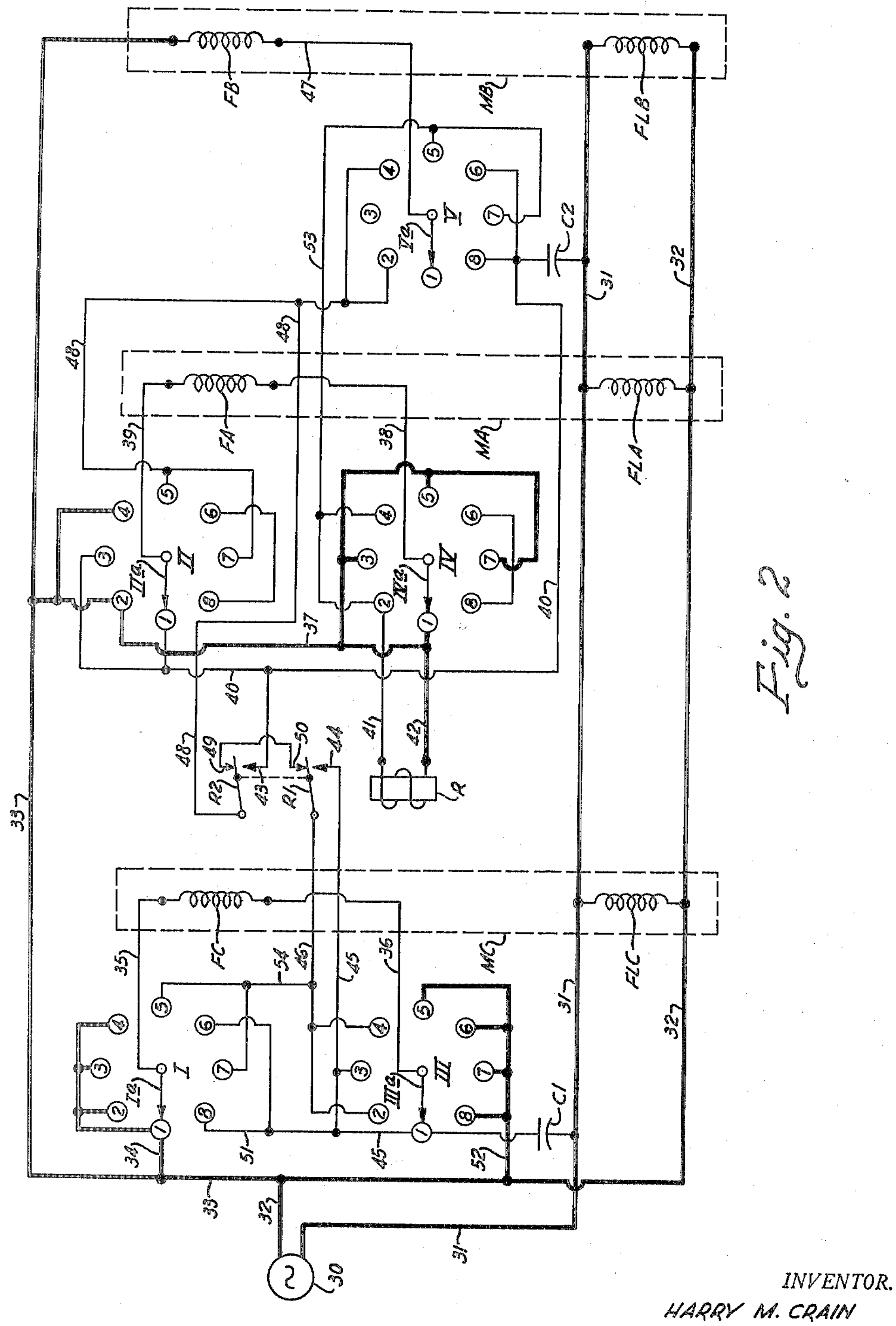

A preferred embodiment of this invention is shown in the accompanying drawings, in which Fig. 1 is a diagrammatic view of a tape recorder embodying this invention; and Fig. 2 is a wiring diagram of the motor circuits therein, controlled by the multi-position switch and the sensing relay.

Referring to Fig. 1, a magnetic tape 11, comprising a long tape coated with magnetic material, is shown coiled on two tape holding reels A and B. Between those reels, the tape is supported by idlers 12 in operative relation to an electromagnetic transducer 13, which includes the usual recording, erasing and reproducing heads. The idler-supported portion of the tape also passes between a rotatable capstan C and a pressure idler 15. The latter is mounted on an arm 16, which is connected through a spring coupling 17 to a second arm 18, on the end of which is mounted a cam follower 19 adapted to engage a rotatable cam 21. The arms 16 and 18 are slidably mounted on suitable supports (not shown). In certain positions, the cam 21 urges the pressure idler 15 towards the capstan for drivingly engaging the tape between them; and in other positions, the cam permits the pressure idler to be withdrawn from the tape under the urging of a tension spring 20, so that the tape will freely pass the capstan and be unaffected by its rotation.

The reels A and B are connected to electric motors MA and MB, respectively, which are preferably of the split-phase or capacitator-start type, developing a small but substantially equal torque. The capstan C is connected through a reduction drive 22 to a reversible electric motor MC, which is likewise of the split-phase or capacitator-start type and is preferably also a synchronous motor. Since the tape speed is controlled by the capstan and should not be appreciably affected by the pull or drag of the reel motors, the capstan should develop a substantially greater tape translating force than either of the reel motors. However, because of the reduction drive 21, the capstan motor need not be any larger than the reel motors.

The motor circuits are controlled by a multi-position switch S, which as herein described comprises a five-pole, eight-throw rotary switch. It may be conveniently made of five superimposed sections (only a single section I being shown in Fig. 1), each section having eight contacts, numbered 1 to 8, adapted to be successively engaged in eight switch positions by a contact arm (only one of those contact arms I*a* being shown in Fig. 1). Those arms are mounted on a common shaft 24, on which is also mounted the cam 21. It will be apparent from Fig. 1 that cam follower 19 and pressure idler 15 will occupy their full line positions (in which the capstan is disengaged from the tape) in six positions of switch S and that in two switch positions (the third and sixth) those elements will occupy their broken line positions (in which the capstan engages the tape). A stop 25 prevents the switch arms of switch S from moving directly from the first to the eighth switch position.

The circuits controlled by switch S are shown in Fig. 2, wherein the five sections of this switch are schematically represented and designated I to V, inclusive, each section having contacts numbered 1 to 8, which are adapted to be contacted respectively by contact arms I*a*, II*a*, etc. They are shown in their first switch position engaging the first contact of each switch section. The reel motors MA and MB and the capstan motor MC are represented schematically by their upper (quadrature) windings FA, FB, and FC, respectively, and by their lower (line) windings FLA, FLB, and FLC, respectively. A phasing capacitator C1 is associated with winding FC of capstan motor MC, and a second phasing capacitator C2 is adapted to be connected in series with the quadrature winding of either of the reel motors MA and MB. A source of alternating current 30 is connected to some of the switch sections and to some of the windings by the conductors shown in heavy lines, which are always "hot" regardless of the positions of the contact arms in those sections.

The first switch position of switch S is a counterclockwise winding position, in which the tape is rapidly wound on reel A (rotating counterclockwise); and the capstan, although rotating, is not engaged with the tape.

In this first switch position, current from the alternating supply source 30 excites the lower winding of each motor through conductors 31 and 32. It also excites the upper winding FC of the capstan motor through conductors 33 and 34, switch arm I*a*, conductors 35 and 36, switch arms III*a*, phasing capacitator C1 and conductor 31. Because of the phasing capacitator, the current in winding FC has a 90° phase difference from the current in winding FLC. According to the convention adopted in this drawing, the capstan motor MC, when connected in the circuit as above described, rotates in a counterclockwise direction and the capstan rotates in the opposite direction (due to the reversing effect of the reduction drive 22). As previously pointed out, the capstan does not, however, engage the tape in this switch position.

In the same switch position, the upper winding FA of reel motor MA is excited by line current flowing through conductors 33 and 37, switch arm IV*a*, conductors 38 and 39, switch arm II*a*, conductor 40, phasing capacitator C2, and conductor 31. With both of its windings excited, motor MA rotates according to the adopted convention in a counterclockwise direction, to exert a winding torque on its connected reel A, which acts as the take-up reel.

Also in this first switch position, the lower winding FLB of reel motor MB is energized by current flowing in conductors 31 and 32, but its upper winding is not energized. Motor MB rotates, however, in a counterclockwise direction, because of the unwinding of the tape from its connected reel. The electrical self-losses in the form of eddy currents created in that motor, by its rotation with only one winding excited, produce sufficient drag to ensure adequate tension on the tape as it is unwound from reel B.

The second switch position of switch S is a stop position, in which (as in all of the stop positions) kinetic energy carried over from the previous running position is used to brake the system dynamically and bring the tape to a smooth stop. The circuit arrangements for obtaining that result are controlled by switch S and by a sensing relay R. The latter is normally deenergized, so that its two switches R1 and R2 are normally in their released positions shown in Fig. 2; but in the second switch position of switch S that relay is initially energized by current induced in winding FA of the take-up reel motor MA. The coil of relay R is connected across that winding by conductor 41, switch arm IV*a*, conductors 38 and 39, switch arm II*a*, and conductors 37 and 42. Since motor MA is still rotating from the inertia of its previous rotations and has only one of its windings (FLA) excited, it now acts as a generator to energize relay R. The normally open contacts 43 and 44 of that relay close; and through those closed contacts the capstan motor MC continues to be connected to the A. C. current supply and continues to rotate, but with the capstan disengaged from the tape. Its lower winding FLC is excited, as before, through conductors 31 and 32; and its upper winding FC is now excited by current passing through conductor 31, phasing capacitator C1, conductor 45, closed contact 44 of relay R, conductor 46, switch arm III*a*, conductors 36 and 35, switch arm I*a*, and conductors 34 and 33. At the same time, the supply reel motor MB is energized and rotates in a clockwise direction to apply a winding torque to its connected reel, which slows down the continued rotation of the take-up reel motor MA. Motor MB is energized as follows: its lower winding FLB receives current through conductors 31 and 32; and its upper winding FB is excited by current flowing through the circuit path defined by conductors 33 and 47, switch arm V*a*, conductor 48, now closed contact 43 of relay R, conductor 40, phasing capacitator C2, and conductor 31. The dynamic braking exerted by the torque of motor MB quickly slows down the rotation of motor MA until a point is reached, depending on the sensitivity of relay R, at which the current induced by motor MA acting as a generator is no longer sufficient to energize that relay, and its associated switches assume their up or released positions, opening contacts 43 and 44 and closing contacts 49 and 50. When that happens the upper winding FC of capstan motor MC is disconnected from the current supply 30, and the capstan motor continues to rotate by inertia alone, with one of its windings FLC still excited by the line current. Under those conditions, motor MC acts as a generator, and the current induced in its winding FC is used to excite the upper winding FB of the supply reel motor MB. The circuit path followed by this induced current is from the upper terminal of winding FC, through conductor 35, switch arm I*a*, and conductors 34 and 33 to the upper terminal of winding FB, and from the lower terminal of that winding through conductor 47, switch arm V*a*, conductor 48, now closed contacts 49 and 50 of relay R, conductor 46, switch arm III*a*, and conductor 36 connected to the lower terminal of winding FC. This induced current causes motor MB to continue to apply a winding torque to its connected supply reel, further opposing and finally stopping the winding of the tape on the take-up reel A.

The third switch position of switch S is a counterclockwise recording (or playback) position in which the tape is wound on reel A at a speed controlled by the rate of rotation of capstan C. The capstan now drivingly engages the tape, the cam 21 having turned to bring cam follower 19 and pressure idler 15 into their broken line positions in Fig. 1; and the capstan controls the speed of translation of the tape past the recording heads, because capstan motor MC, through the speed reduction drive 22, develops at the capstan a substantially greater tape translating force than net winding torque exerted by the reel motors. In this switch position, all of the motors are connected in the same circuit arrangement as in the first switch position, as will be apparent from Fig. 2, which shows the first and third contacts of each switch section to be interconnected or isolated.

The fourth switch position is a stop position, in which the circuit connections are identical with those described for the second switch position, and in which the dynamic braking of the system takes place as previously described.

The fifth switch position is also a stop position, which is either passed over momentarily and without effect in going from the fourth switch position (a stop position) to the sixth switch position (a running position), or is occupied effectively to stop the system when the switch has previously occupied its sixth switch position. It is necessary to have these two adjacent stop positions (the fourth and fifth switch positions), because in the adjacent running positions the tape is moved in different directions and different circuit arrangements are required to brake the system. Since the fifth switch position produces the same circuit configuration as the seventh, the circuit connection in both of those positions will be explained after discussing the sixth switch position.

The sixth switch position is a clockwise recording (or playback) position, in which the tape is wound on reel B (rotating clockwise) at a speed controlled by capstan C, which drivingly engages the tape as in the third switch position. The connections between the upper winding FC of capstan motor MC and the source of current 30 are the reverse of those in the first and third switch positions, i. e., the upper terminal of winding FC, instead of the lower terminal, is now connected to the phasing capacitator C1, through conductor 35, switch arm I*a*, and conductors 51 and 45. The lower terminal of the same winding is supplied with line current through conductor 36, switch arm III*a*, and conductors 52 and 32. As a result, capstan motor MC rotates in a direction opposite to that in the first and third switch positions. The upper winding FB of reel motor MB (reel B now acting as the take-up reel) is connected to the source of current supply through conductor 33 on one side, and through conductor 47, switch arm V*a*, phasing capacitator C2, and conductor 31 on the other side. The winding FLB is excited as before, so that motor MB rotates in a clockwise direction. Only the line winding FLA of reel motor MA is excited in this switch position, so that, as this motor is rotated by the tape being unwound from its connected reel A (now acting as the supply reel), the electrical self losses in motor MA provide a dynamic brake or drag that maintains the tape under proper tension.

In the seventh switch position, the same circuit configuration prevails as in the fifth switch position. Motor MB acts as a generator for the initial phase of the stopping operation and capstan motor MC acts as a generator in the final phase of that operation. Except for the fact that the tape is moving in the opposite direction, the situation is similar to that occurring in the second and fourth positions. Relay R is temporarily energized by current induced in winding FB of reel motor MB, flowing through conductors 33, 37 and 42 and through conductor 47, switch arm V*a*, and conductors 53 and 41. Line current is thereby supplied to both windings of the capstan motor MC, which continues to rotate out of engagement with the tape. The upper winding FC of that motor obtains current through conductor 35, switch arm I*a*, conductors 54 and 46, closed contact 44 of relay R, conductor 45, phasing capacitator C1, and conductor 31; and through conductor 36, switch arm III*a*, and conductor 52. Line current is also supplied to both sides of reel motor MA, so that it applies a winding torque to its connected reel that opposes and slows down the rotation of motor MB. The circuit path of the line current exciting the upper winding FA of motor MA is through conductors 33 and 37, switch arm IV*a*, and conductor 38; and also through conductor 39, switch arm II*a*, conductor 48, closed contact 43 of relay R, conductor 40, phasing capacitator C2, and conductor 31. When motor MB is slowed down to the point where it can no longer energize relay R, the switch arms of that relay assume their normal released positions, disconnecting the upper winding FC of capstan motor MC from the line current, so that motor MC now acts as a generator supplying an induced current to the upper winding FA of motor MA, which continues to apply a winding torque to its connected reel until the movement of the tape is stopped. The circuit path for this induced current is through conductor 36, switch arm III*a*, conductors 52, 33, and 37, switch arm IV*a*, and conductor 38; and also through conductor 39, switch arm II*a*, conductor 48, closed contacts 49 and 50, conductors 46 and 54, switch arm I*a*, and conductor 35.

The eighth switch position is a clockwise winding position in which the tape is wound at high speed on reel B, with the capstan disengaged from the tape. The circuit configuration is the same as in the sixth switch position (contacts 6 and 8 of the various switch sections being interconnected).

The operating conditions in each of the eight switch positions described above may be summarized as follows:

In the tape recording positions of the switch (in which the capstan engages the tape), the source of current is connected directly to the capstan motor and to the take-up reel motor, but to only one of the two windings of the supply reel motor, so that the capstan motor drives the tape at a constant speed and the tape is wound on the take-up reel, electrical self losses in the supply reel motor creating a dynamic drag that provides adequate tension on the tape.

In the tape winding positions of the switch (in which the capstan is disengaged from the tape), the circuit connections are the same as in the tape recording positions, so that the capstan motor rotates under no load and the tape is wound under tension on the take-up reel at a speed determined by the difference between the torque of the take-up reel motor and the drag of the supply reel motor.

In the tape stopping positions of the switch (in which the capstan is also disengaged from the tape), dynamic braking is obtained in two stages. In the first stage, the inertial rotation of the take-up reel motor is used to energize temporarily a sensing relay, which in its energized position supplies line current to the capstan motor so that it continues to rotate under no load, and also supplies line current to the supply reel motor to cause it to exert a winding torque on the supply reel that opposes and slows down the continued rotation of the take-up reel motor. When the latter has been slowed down to the point where it can no longer energize the sensing relay, the latter assumes its released position and changes the circuit arrangement to the second stage of the braking operation. In that stage, none of the motors is driven by line current; the kinetic energy of the capstan motor is used to generate an induced current that is supplied to the supply reel motor to cause it to exert a winding torque on the supply reel that further opposes and slows down the winding of the tape on the take-up reel and brings the system to a stop.

It will be apparent from the foregoing description that if the sensing relay is made sufficiently sensitive, most of the dynamic braking will occur in the first stage of the braking operation, in which the line current, rather than an induced current, is used to slow down the movement of the tape. Only in the second and final stage is the braking done by an induced current supplied by the capstan motor. As a result, the size of the capstan motor can be greatly reduced from what would be required if all of the braking effort had to come from its inertial rotation.

While the embodiment of the invention herein described has been limited to motors of the split-phase type, it should be understood that the principles of this invention are equally applicable to other alternating current motors, and to modifications of the circuits shown in Fig. 2. For example, with certain types of reel motors, particularly if they are connected to their respective reels through gearing, there may be sufficient mechanical friction to provide adequate tension on the tape, without the necessity of providing dynamic drag by the supply reel motor as described herein.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A drive mechanism for use in a magnetic tape recorder having a supply reel and a take-up reel and a rotatable capstan for drivingly engaging the tape between the reels, comprising separate electric motors including a capstan motor connected to the capstan and two reel motors each connected to a different reel for applying a winding torque to that reel, a source of electric current, a sensing relay having an energized and a released position, an electrical circuit including the capstan motor and the two reel motors and the sensing relay, switch means connected in the electrical circuit and having tape running and tape stopping positions, said switch means in their tape running positions connecting the source of current to the capstan motor and to the take-up reel motor for winding the tape on the take-up reel, and said switch means in their tape stopping positions connecting the take-up reel motor, while it is still rotating from the inertia of its previous rotation in a tape running position, as a generator to supply an induced current to the sensing relay for temporarily energizing that relay, and also connecting the supply reel motor to the source of current through the relay in its energized position to cause that motor to exert a winding torque on the supply reel to slow down the rotation of both reels until the sensing relay is deenergized and assumes its released position, said relay in its released position connecting the capstan motor as a generator to the supply reel motor to cause the latter to apply a winding torque to the supply reel for further slowing down and finally stopping movement of the tape.

2. A drive mechanism according to claim 1 that includes the additional elements of tape engaging means for bringing the tape into driving engagement with the capstan in at least one of the tape running positions of said switch means and for disengaging the tape from the capstan in each of the tape stopping positions of said switch means.

3. A drive mechanism according to claim 2, in which said tape engaging means includes a pressure idler, and cam means operated by said switch means for forcing the pressure idler towards the capstan for drivingly engaging the tape between the capstan and idler.

4. A drive mechanism for use in a magnetic tape recorder having two tape holding reels adapted to act interchangeably as a supply reel and a take-up reel and having a rotatable capstan adapted to be brought into and out of driving engagement with the tape between the reels, said mechanism comprising three electric motors of the split-phase type, each having a quadrature winding and a line winding adapted to be excited by different phases of alternating current; said motors including a reversible capstan motor connected to the capstan, a supply reel motor connected to the supply reel, and a take-up reel motor connected to the take-up reel; a sensing relay having an energizing coil and having switch means controlled by the coil, said switch means assuming an energized position when the coil is energized and a released position when the coil is deenergized; a source of alternating current; a closed electrical circuit including the source of current and the line winding of each of said motors; a second electrical circuit including the sensing relay and the quadrature winding of each of said motors; a multi-position switch connected in said second circuit having tape running and tape stopping positions, said switch in its tape running positions connecting the source of current to the quadrature winding of the capstan motor and the take-up reel motor, whereby the tape will be wound on the take-up reel against the drag of the supply reel motor created by electrical self losses in that motor; the multi-position switch in its tape stopping positions connecting the quadrature winding of the take-up reel motor to the coil of the sensing relay, whereby the continued rotation of the take-up reel motor from the inertia of its previous rotation will induce a current in its quadrature winding for temporarily energizing the sensing relay to cause the switch means of that relay to assume temporarily their energized position; the multi-position switch in its tape stopping positions also connecting the quadrature winding of the supply reel motor to the source of electric current through the switch means of the sensing relay in their energized position to cause the supply reel motor to exert a winding torque on its connected reel that will oppose and slow down the winding of the tape on the take-up reel to the point where the take-up reel motor no longer generates sufficient current to energize the sensing relay and the switch means of that relay assume their released position, in which position they disconnect the quadrature winding of the capstan motor and the supply reel motor from the source of current and interconnect those two windings with each other, whereby the capstan motor will act as a generator and its continued rotation from the momentum of its previous rotation will induce a current in its quadrature winding for exciting the connected winding of the supply reel motor to cause the latter to continue to exert a winding torque on the supply reel that will stop the tape.

5. A drive mechanism for use in a magnetic tape recorder having a supply reel and a take-up reel and a rotatable capstan adapted to be brought into and out of engagement with the tape between the reels, comprising separate electric motors including a reversible capstan motor connected to the capstan and two reel motors each connected to a different reel for applying a winding torque thereto, each of said motors having a plurality of electrical reel windings including a quadrature winding and a line winding, a source of electric current connected to the line winding of each of said motors, a sensing relay having an energized and a released position, an electrical circuit including the capstan motor and the two reel motors and the sensing relay, switch means connected in that circuit and having tape running and tape stopping positions, said switch means in their tape running positions connecting the source of current to the quadrature winding of the capstan motor and to the quadrature winding of the take-up reel motor for winding the tape on the take-up reel, and said switch means in their tape stopping positions connecting the quadrature winding of the take-up reel motor, while that motor is still rotating from the inertia of its previous rotation in a tape running position, to the sensing relay for generating an induced current in that winding to energize that relay temporarily, said switch means in its tape stopping positions also connecting the source of current through the sensing relay in its energized position to the quadrature winding of the capstan motor for maintaining its rotation with the capstan out of engagement with the tape and also connecting the source of current to the quadrature winding of the supply reel motor to cause that motor to exert a winding torque on the supply reel that will slow down the rotation of both reels to the point where the take-up reel motor can no longer generate sufficient current to energize the sensing relay and that relay will assume its released position, said relay in its released position disconnecting the quadrature winding of the still-rotating capstan motor from the source of current and connecting it to the corresponding winding of the supply reel motor, whereby the capstan motor will act as a generator and supply an induced current to the supply reel motor to cause the latter to continue to exert a winding torque on the supply reel for further slowing down and finally stopping movement of the tape.

References Cited in the file of this patent

UNITED STATES PATENTS

| | | |
|---|---|---|
| 2,162,527 | Cook | June 13, 1939 |
| 2,223,728 | Kenyon | Dec. 3, 1940 |
| 2,310,713 | Shoults et al. | Feb. 9, 1943 |
| 2,538,893 | Begun | Jan. 23, 1951 |